(12) United States Patent
Larson et al.

(10) Patent No.: US 7,953,924 B1
(45) Date of Patent: *May 31, 2011

(54) SYSTEM AND METHOD FOR COORDINATING CLUSTER STATE INFORMATION

(75) Inventors: Richard O. Larson, Cupertino, CA (US); Alan L. Rowe, San Jose, CA (US); Joydeep sen Sarma, Mountainview, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/692,030

(22) Filed: Jan. 22, 2010

Related U.S. Application Data (63) Continuation of application No. 11/760,484, filed on Jun. 8, 2007, now Pat. No. 7,685,358, which is a continuation of application No. 10/378,400, filed on Mar. 3, 2003, now Pat. No. 7,231,489.

(51) Int. Cl.
*G06F 12/00* (2006.01)
*G06F 15/167* (2006.01)

(52) U.S. Cl. ........ 711/111; 711/114; 711/152; 711/163; 709/216; 709/219

(58) Field of Classification Search .................. 711/111, 711/114, 152, 163; 709/216, 219
See application file for complete search history.

(56) References Cited

U.S. PATENT DOCUMENTS

| | | | |
|---|---|---|---|
| 4,937,763 A | 6/1990 | Mott | |
| 5,067,099 A | 11/1991 | McCown et al. | |
| 5,157,663 A | 10/1992 | Major et al. | |
| 5,163,131 A | 11/1992 | Row et al. | |
| 5,355,453 A | 10/1994 | Row et al. | |
| 5,485,579 A | 1/1996 | Hitz et al. | |
| 5,553,239 A | 9/1996 | Heath et al. | |
| 5,633,999 A | 5/1997 | Clowes et al. | |
| 5,680,580 A | 10/1997 | Beardsley et al. | |
| 5,781,770 A | 7/1998 | Byers et al. | |
| 5,802,366 A | 9/1998 | Row et al. | |
| 5,812,748 A | 9/1998 | Ohran et al. | |
| 5,812,751 A | 9/1998 | Ekrot et al. | |
| 5,819,292 A | 10/1998 | Hitz et al. | |

(Continued)

FOREIGN PATENT DOCUMENTS

WO    WO 01/35244 A1    5/2001

OTHER PUBLICATIONS

Gole et al., "Efficient Use of NVRAM During Takeover in a Node Cluster", U.S. Appl. No. 10/011,844, filed Dec. 4, 2001, 34 pages.

Hitz et al. TR3002 File System Design for a NFS File Server Appliance published by Network Appliance, Inc., Jul. 9, 2001.

(Continued)

*Primary Examiner* — Jack A Lane
(74) *Attorney, Agent, or Firm* — Cesari and McKenna, LLP (57) ABSTRACT

A method for managing a plurality of servers is disclosed. Each server of the plurality of servers has access to data stored by other servers. The data is stored to one or more data storage devices. Coordinating information is written for the plurality of servers to a master mailbox record. The coordinating information includes data that each server uses to recover after a failure by a server. The master mailbox record is stored on a selected storage device at a location known to the plurality of servers, and the selected storage device is designated as a lock storage device. A plurality of lock storage devices is chosen so that in the event of failure of a server of the plurality of servers, at least one lock storage device will be available to the remaining servers.

29 Claims, 9 Drawing Sheets

U.S. PATENT DOCUMENTS

| | | | |
|---|---|---|---|
| 5,931,918 | A | 8/1999 | Row et al. |
| 5,941,972 | A | 8/1999 | Hoese et al. |
| 5,951,695 | A | 9/1999 | Kolovson |
| 5,963,962 | A | 10/1999 | Hitz et al. |
| 6,038,570 | A | 3/2000 | Hitz et al. |
| 6,065,037 | A | 5/2000 | Hitz et al. |
| 6,119,244 | A | 9/2000 | Schoenthal et al. |
| 6,292,905 | B1 | 9/2001 | Wallach et al. |
| 6,425,035 | B2 | 7/2002 | Hoese et al. |
| 6,457,130 | B2 | 9/2002 | Hitz et al. |
| 6,625,749 | B1 | 9/2003 | Quach |
| 6,728,897 | B1 | 4/2004 | Cramer et al. |
| 6,775,702 | B2 | 8/2004 | Oeda et al. |
| 7,231,489 | B1 | 6/2007 | Larson et al. |
| 2002/0055950 | A1 | 5/2002 | Witteman |
| 2003/0088638 | A1 | 5/2003 | Gluck et al. |
| 2004/0010545 | A1 | 1/2004 | Pandya |

OTHER PUBLICATIONS

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al., (1999) Request for Comments (RFC) 2616, HTTP/1.1.

ANSI X3.230-1994, Fibre Channel Physical and Signaling Interface (FC-PH), published by the American National Standards Institute.

European Search Report for Application No. EP 01 01 6755, Nov. 8, 2004 pp. 1-3.

Bhide et al., "A Highly Available Network File Server," Proceedings of the Winter 1991 USENIX Conference, Jan. 21-25, 1991, pp. 199-205.

Snively et al., "New Identifier Formats Based on IEEE Registration", retrieved from http://standards.ieee.org/regauth/oui/tutorials/fibreformat.html on Aug. 6, 2001, 6 pages.

SYSTEM AND METHOD FOR COORDINATING CLUSTER STATE INFORMATION

RELATED APPLICATIONS

This application is a continuation of U.S. patent application Ser. No. 11/760,484, filed on Jun. 8, 2007, now issued as U.S. Pat. No. 7,685,358 on Mar. 23, 2010, entitled SYSTEM AND METHOD FOR COORDINATING CLUSTER STATE INFORMATION, which is a continuation of U.S. patent application Ser. No. 10/378,400, filed on Mar. 3, 2003, now issued as U.S. Pat. No. 7,231,489 on Jun. 12, 2007, entitled SYSTEM AND METHOD FOR COORDINATING CLUSTER STATE INFORMATION.

FIELD OF THE INVENTION

The present invention relates to clustered computing environments, and, more specifically to clustered file servers.

BACKGROUND OF THE INVENTION

A file server is a computer that provides file service relating to the organization of information on writeable persistent storage devices, such as memories, tapes or hard disks. The file server or filer may be embodied as a storage system including an operating system that implements a file system to logically organize the information as a hierarchical structure of directories and files on, e.g., the disks. Each "on-disk" file may be implemented as a set of data structures, e.g., disk blocks, configured to store information, such as the actual data for the file. A directory, on the other hand, may be implemented as a specially formatted file in which information about other files and directories are stored. An example of a file system that is configured to operate on a filer is the Write Anywhere File Layout (WAFL™) file system available from Network Appliance, Inc., of Sunnyvale, Calif.

As used herein, the term "storage operating system" generally refers to the computer-executable code operable on a storage system that manages data access and may, in the case of a filer, implement a file system semantics, such as the data ONTAP™ storage operating system, implemented as a micro kernel, and available from Network Appliance, Inc., of Sunnyvale, Calif., which implements a Write Anywhere File Layout (WAFL™) file system.

The storage operating system can also be implemented as an application program operating over a general-purpose operating system, such as UNIX® or Windows NT®, or as a general-purpose operating system with configurable functionality, which is configured for storage applications as described herein.

A file server is organized to include one or more storage "volumes" that comprise a group of physical storage disks, defining an overall logical arrangement of storage space. Currently available filer implementations can serve a large number of discrete volumes. Each volume is generally associated with its own file system (WAFL for example). The disks within a volume/file system are typically organized as one or more groups of Redundant Array of Independent (or Inexpensive) Disks (RAID).

It is advantageous for the services and data provided by a storage system to be available for access to the greatest degree possible. Accordingly, some computer storage systems provide a plurality of filers in a cluster, with the property that when a first filer fails, a second filer is available to take over and provide the services and the data otherwise provided by the first filer. The second filer provides these services and data by a "takeover" of resources otherwise managed by the failed first filer.

In one example of file servers, nonvolatile memory is utilized to improve overall system performance. Data written by a client is initially stored in the nonvolatile memory before the file server acknowledges the completion of the data write request of the client. Subsequently, the data is transferred to another storage device such as a disk. In a cluster configuration, each file server in a cluster maintains a copy of the data stored in its partner's nonvolatile memory. Such nonvolatile memory shadowing is described in further detail in U.S. patent application Ser. No. 10/011,844 entitled EFFICIENT USE OF NVRAM DURING TAKEOVER IN A NODE CLUSTER by Abhijeet Gole, et al., now issued as U.S. Pat. No. 7,730,153 on Jun. 1, 2010, which is incorporated herein by reference. Nonvolatile memory shadowing ensures that each file server in a file server cluster can takeover the operations and workload of its partner file server with no loss of data. After a takeover by a partner filer from a failed filer, the partner filer handles file service requests that normally were routed to it from clients, in addition to file service requests that previously had been handled by the failed filer.

When a filer in a file server cluster detects a loss of activity by its partner filer, and therefore decides to take over the workload of the other filer, it must record this decision. When the other filer eventually recovers it will, thus, wait for an orderly and cooperative transfer of the workload back from the backup filer. By "workload" is meant the file services typically handled or performed by a particular file server. This orderly transfer of the workload is called a "give back." The backup filer, while serving the workload of the failed filer, does not conduct nonvolatile memory shadowing of the workload back to the failed filer. Nonvolatile memory shadowing is not performed at this time because, in general, the failed filer is unable to receive the memory shadowing while it is awaiting repair or reboot. Additionally, there may be a failure of a component, for example the cluster interconnect that links file servers in a cluster, which thereby prevents the non-volatile memory shadowing process from operating correctly. However, component failure would not prevent either filer from serving its normal workload. In such a case, the filer serving a workload may decide to continue with the nonvolatile memory shadowing process deactivated. However, this decision must be recorded so that the other filer is aware that it no longer has a valid copy of the nonvolatile memory data of its partner, and therefore, should not initiate a takeover of the partner's workload until the nonvolatile memory shadowing process has been restored. It follows that this coordination information must be stored in a place accessible to both filers and that his coordination information must be persistent, e.g., survive a power failure of the filers or whatever mechanism is used to store the coordination information.

Using synchronous mirroring, user data is stored on two distinct sets of physical storage devices (RAID disk arrays, for example). The goal of synchronous mirroring is to be able to continue operating with either set of data and devices after some equipment failure precludes the use of or access to the other set of data or devices. A mirrored volume may have one or both data sets containing up-to-date data. There must be coordination to allow the system to determine which (if any) of the accessible data sets is current. It follows that this coordination information must be stored in a place accessible to both filers, and that this coordination information must be persistent (e.g., survive a power failure of the filers or of whatever mechanism is used to store the coordination information). As the coordination information is critical to the correct system operation it must also be stored on a plurality of devices in order not to limit availability, which would hamper the goal of minoring.

A common problem is presented in each of these situations namely, that there are certain useful recovery actions that each filer may perform, but it is critical that if one action should take place an otherwise proper action by the other filer must be prevented from occurring. This is referred to as "mutual exclusion."

The required mutual exclusion for the two previously described scenarios are that first, Filer A may fail, then reboot, and then resume its workload. Alternatively, Filer A may fail, and then Filer B may takeover the workload of Filer A. However, if Filer B takes over the workload of Filer A, then Filer A must not reboot and resume its workload until the orderly transfer of workload back from Filer B is completed. Second, the failure of the cluster interconnect may cause the "non-volatile memory shadowing" process to be stopped. The same or similar failure may be perceived as a loss of one filer by the other, leading to the initiation of a takeover process. But if Filer A decides to continue service with the "non-volatile memory shadowing" disabled, then Filer B must not do a takeover of the workload of Filer A because it no longer processes a valid copy of all the necessary information.

Achieving the necessary mutual exclusion requires the storage of a small quantity of coordinating information. Information recorded by one file server must be available to the other file server at some later time, perhaps after the first file server has suffered an additional failure. Hence the information must be recorded on direct access storage, because this is the only medium in the configuration that has the necessary attributes of persistence and shared access by both file servers.

Because the coordinating information is critical to providing service to the clients it must be highly available and be protected against loss due to various causes. Three causes are of particular interest, namely, the loss of information due to concurrent access by two filer servers, the loss of information due to device failure, such as disk failure, and the loss of information due to loss of some connectivity from one or more filer servers to one or more devices.

A known solution of ensuring that the coordinating information required by the filers of a cluster is accessible by both file servers is the use of a single disk mailbox system. A disk mailbox is a small (e.g., 4 kilobyte (KB)) file or disk block stored on a disk, which is accessible to both filers of a file server cluster. A noted disadvantage of the mailbox system is apparent when the file servers of the cluster are utilizing synchronous mirroring (e.g., when a set of data is stored on two distinct sets of physical storage devices) or when the file servers of a cluster are geographically separated. These designs allow for more complex failure scenarios than could occur using traditional file server topologies. In known disk mailbox implementations, the information most recently stored by one file server is not guaranteed to be retrieved by the other file server in all possible cases of failure.

Two problems encountered in clustering configurations are commonly referred to as "partition in space" and "partition in time" problems. As used herein, the partition in time and partition in space problems may be collectively referred to as partitioning problems. Alternately, they may be referred to as a loss of data consistency. The partition in space problem occurs when there are failures of the connectivity between file servers and storage devices that allow different file servers to have access to different sets of storage devices at the same time. The partition in space problem is likely to occur in a geographically separated environment, due to the complexities of communication over long distances and the greater likelihood of communication equipment failure.

The partition in time problem occurs when connectivity is lost to one set of devices as a result of a power failure or other failures to the storage fabric. The system may continue to operate with the remaining set of devices, however, during that time, any newly written data will be stored only on that one set of devices. If connectivity is then lost to that set of devices and if connectivity is then restored only to the other set of devices, it is possible that the system may restart with only the data present before the first connectivity failure.

Thus, by using known mailbox systems, it is possible for data integrity to be lost due to either a partition in time or partition in space problem as described above.

SUMMARY OF THE INVENTION

The noted disadvantages of the prior art are overcome by providing an improved mailbox mechanism which ensures that coordinating information is accessible to any computer or file server in a cluster. A system and method for the improved mailbox mechanism incorporates a master mailbox record (MMR) that may be written to a specific location on any disk connected to a cluster. This permits the file servers to access the MMR without the need for file system semantics, such as a status of a volume or other file system implementation specific features. Included within this specific location of blocks on disk are two copies of the MMR, each of which contains certain header information and the requisite coordinating data. Two copies are maintained so that a careful write procedure, in which one copy is written and then the other copy is written, may be utilized to prevent the loss of data integrity in the event that power is lost or a disk failure occurs at the time that the MMR is being updated.

The improved mailbox mechanism includes a set of procedures for determining the most up-to-date coordinating information through the use of a set of lock disks. Lock disks are a set of disks guaranteed to contain the most up-to-date coordinating information. It should be noted that this set can be in one embodiment, a volume. When an MMR is written to disks, the MMR must be written at least to the set of lock disks. The set of lock disks is chosen so that, in the event of failures of disks or failures of access to disks that can be tolerated by the RAID system or by the implementation of synchronous mirroring, at least one member of the set of lock disks is always accessible, thereby ensuring that the coordinating information is available to the file servers.

BRIEF DESCRIPTION OF THE DRAWINGS

The above and further advantages of the invention might be better understood by referring to the following description in conjunction with the accompanying drawings in which like reference numerals indicate identical or functionally similar elements.

DETAILED DESCRIPTION OF AN ILLUSTRATIVE EMBODIMENT

A. File Server Cluster Environment

Figure 1:
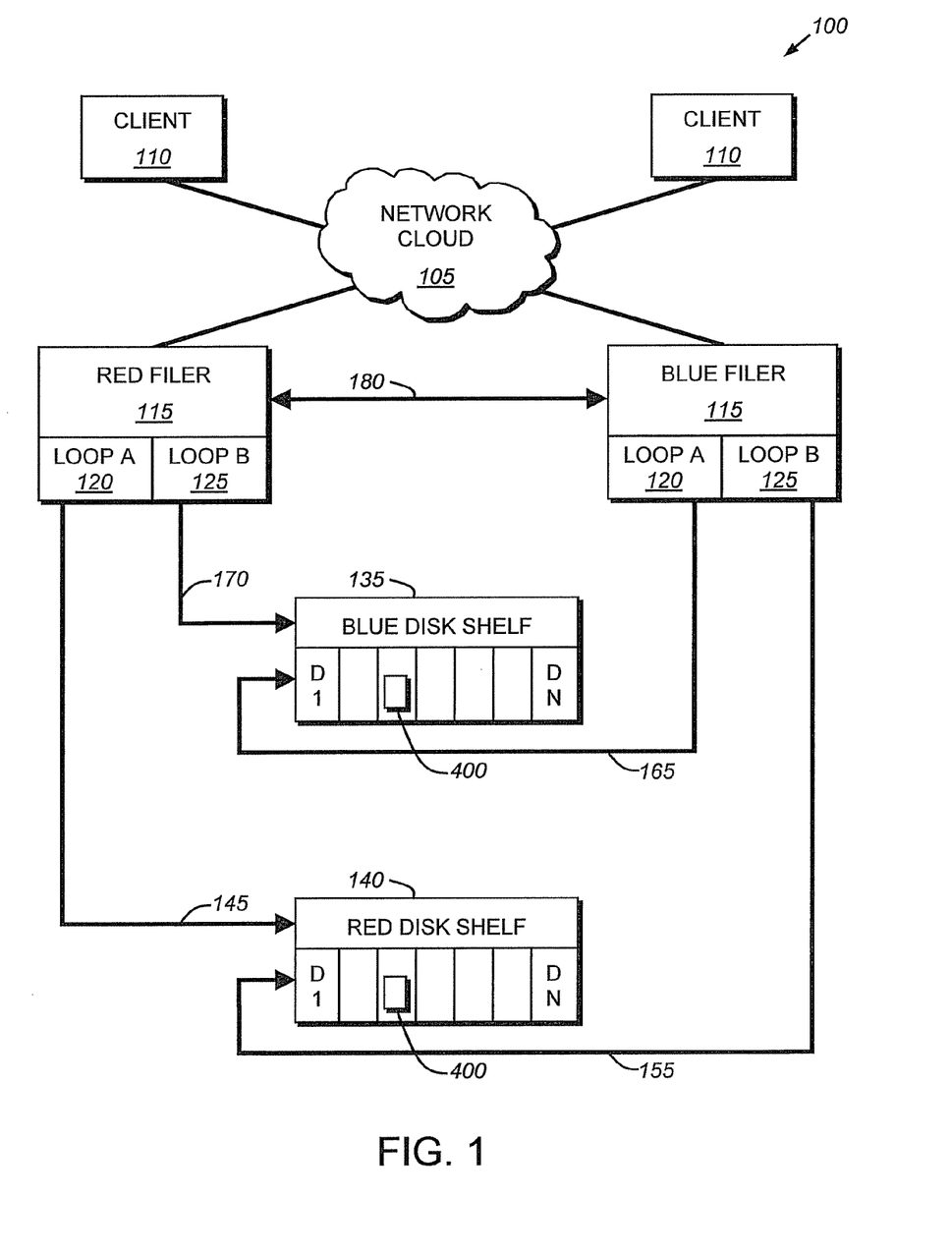
FIG. 1 is a schematic block diagram of an exemplary network environment including a file server cluster and a plurality of disk shelves that may be advantageously used in the present invention.

FIG. 1 is a block diagram of a file server cluster environment 100 having connected as two nodes in the file system cluster two file servers 115. In accordance with known failover techniques, Red Filer and Blue Filer provide takeover protection to each other when one fails. It should be understood that while only two filers and two disk shelves are shown in this illustrative cluster configuration, it is expressly contemplated that multiple filers and disk shelves may be connected in a cluster configuration and provide takeover for each other.

A plurality of clients 110 are connected to a network cloud 105. The network cloud can be comprised of any acceptable networking architecture including, for example, a local area network (LAN), a wide area network (WAN), a virtual private network (VPN) or any other networking architecture including, for example the Internet. A set of file servers, or filers, is also connected to the network cloud. These filers, including Red Filer 115 and Blue Filer 115 form the file server cluster. Each filer 115 includes a plurality of data access ports which enable the file server to be connected to a plurality of disk loops. In the illustrative embodiment, filers 115 include a Port A 120 and Port B 125 connectors. In the illustrative embodiment, each file server is connected to a Fibre Channel loop. Also included in the file server cluster 100 is a set of disk shelves 135 and 140.

Red Filer 115 is connected to Red Disk Shelf 140 via data connection path 145 which are operatively connected with the A Port 120 of Red Filer 115. Similarly, Blue Filer is connected to Red Disk Shelf 140 via data connection 155 which are then connected to Blue Filer's B Port 125. Additionally, Blue Filer is connected to Blue Disk Shelf 135 via data connection 165, while Red Filer is connected to Blue Disk Shelf via data connection 170. In the illustrative embodiment, the filer server which is connected via its A port to a disk shelf is a primary file server for the data stored on that disk shelf.

The network topology described here is exemplary only. It should be noted that it is expressly contemplated that alternate network topologies may be utilized, e.g., via switches, using external RAID boxes, etc.

In accordance with failover methodologies, should a file server in a cluster environment fail, the partner file server will initiate a takeover of the disks which are normally serviced by the failed filer. Thus, for example, if Red Filer should fail, then Blue Filer would take over the operations and service data access requests to those disks normally serviced by Red Filer. It should be noted that the network topology is exemplary only that the principles of the present invention can be implemented using a variety of network configurations.

A client 110 may be a general-purpose computer, such as a PC, configured to execute applications, and operating systems that include file system protocols such as NFS and CIFS. Moreover, each client 110 may interact with a filer 115 in accordance with a client/server model of information delivery. That is, a client 110 may request the services of a filer 115 to retrieve files requested by the client. Clients 110 access filers 115 in cluster 100 via the network cloud 105. In the following paragraphs the description is often singularly referenced to Red Filer or Blue Filer, but it should be kept in mind that the description also applies to the unreferenced counterpart filer.

As part of cluster operation, Red and Blue Filers have primarily assigned to each of them a disk shelf 135 or 140, respectively, comprised of hard disk storage devices D1-DN that operate in a manner well known in the art.

Red Filer accesses its Red Disk Shelf 140 via Port A 120, and accesses Blue Disk Shelf via Port B 125. Similarly, Blue Filer has primarily assigned to it a Blue Disk Shelf B that it accesses via its Port A 120, and it accesses Red Disk Shelf via its Port B 125. Red Filer 115 is the primary file server for Red Disk Shelf 140. Blue Filer would be the backup (or secondary) file server for Red Disk Shelf. Similarly, Blue Filer would be the primary file server for Blue Disk Shelf 135, while Red Filer would be the backup file server for Blue Disk Shelf 135. This joint access is necessary for a non-failed filer to access a failed partner's disk shelf to continue providing file services to the clients of the failed partner after a takeover.

To implement a takeover in the event of failure of a filer, the Red and Blue Filers should communicate with each other in a peer-to-peer capacity across one or more communication links, such as cluster interconnect 180. The cluster interconnect can utilize any communication medium and protocol, including, for example, a Fibre Channel or a ServerNet™ cluster interconnect.

B. File Server

Figure 2:
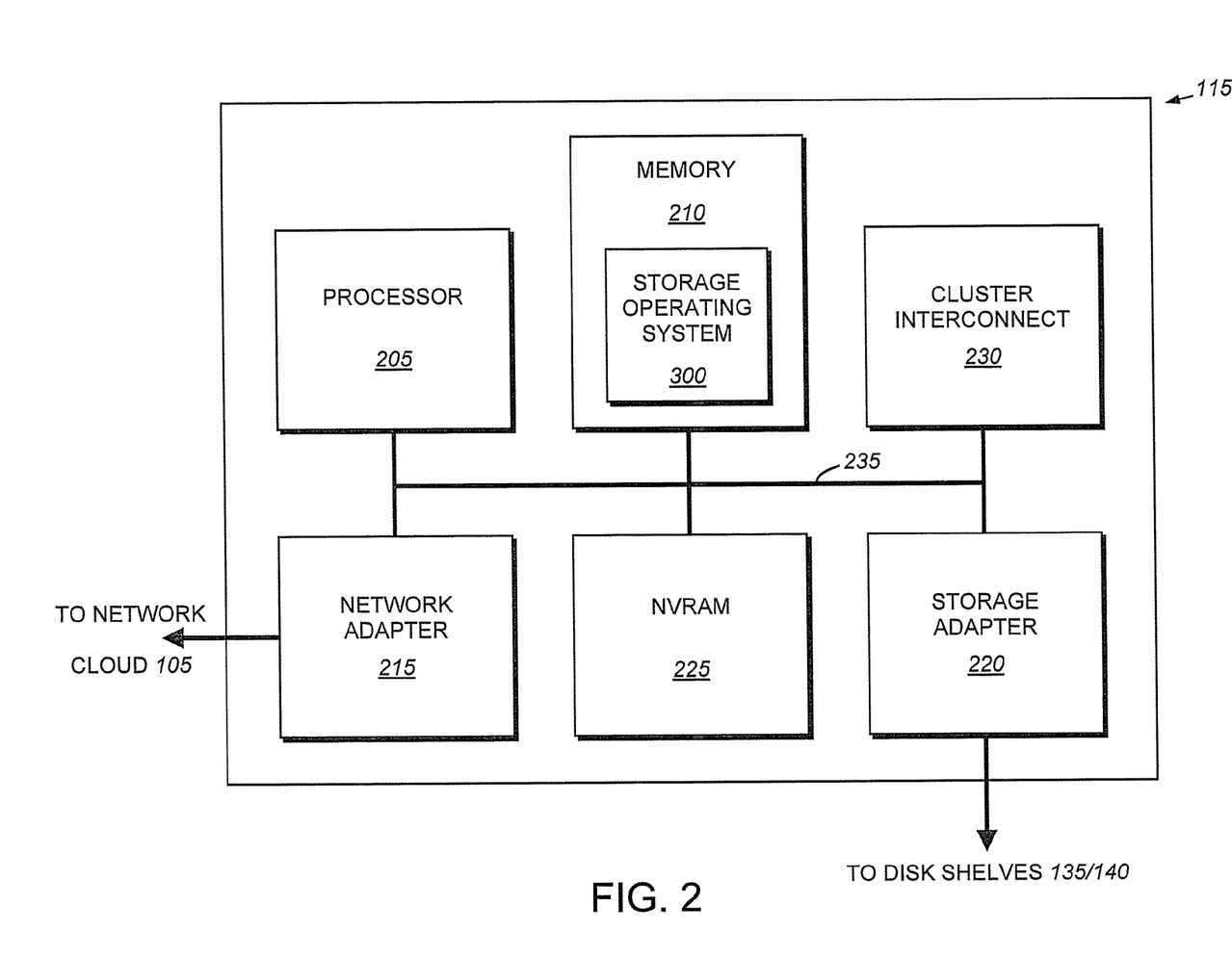
FIG. 2 is a schematic block diagram of an exemplary file server that may be advantageously used with the present invention.

FIG. 2 is a block diagram of file server 200 comprising a processor 205, a memory 210, a storage adapter 220 and at least one network adapter 215 all interconnected by a system bus 235. Storage adapter 220 is connected to disk shelves 135 and 140. The filer also includes a storage operating system 300 stored in memory 210 that implements a file system to logically organize information stored as a hierarchical structure of directories and files on the disks in an assigned disk shelf 135 or 140. The filer also includes a non-volatile random access memory (NVRAM) 225 and cluster interconnect 230.

Memory 210 is organized into storage locations that are addressable by processor 205 and network adapters 215 for storing software application programs (not shown) and the storage operating system 300. The processor executes the operating system and software applications stored in the memory.

Storage adapter 220 cooperates with storage operating system 300 executing on processor 205 to access client requested information stored on hard disks D1-DN. Storage adapter 220 includes input/output (I/O) interface circuitry that couples to the disks D1-DN over an I/O interconnect arrangement, such as a conventional, high-performance, Fibre Channel serial link topology (not shown). Storage adapter 220 retrieves the stored information, which is then processed, if necessary, by processor 205 (or storage adapter 220 itself) prior to being forwarded over system bus 235 to a network adapter 215. The network adapter 215 formats the retrieved information into packets and returns them via a network (not shown) to a client 110 that requested the information.

C. Storage Operating System

Figure 3:
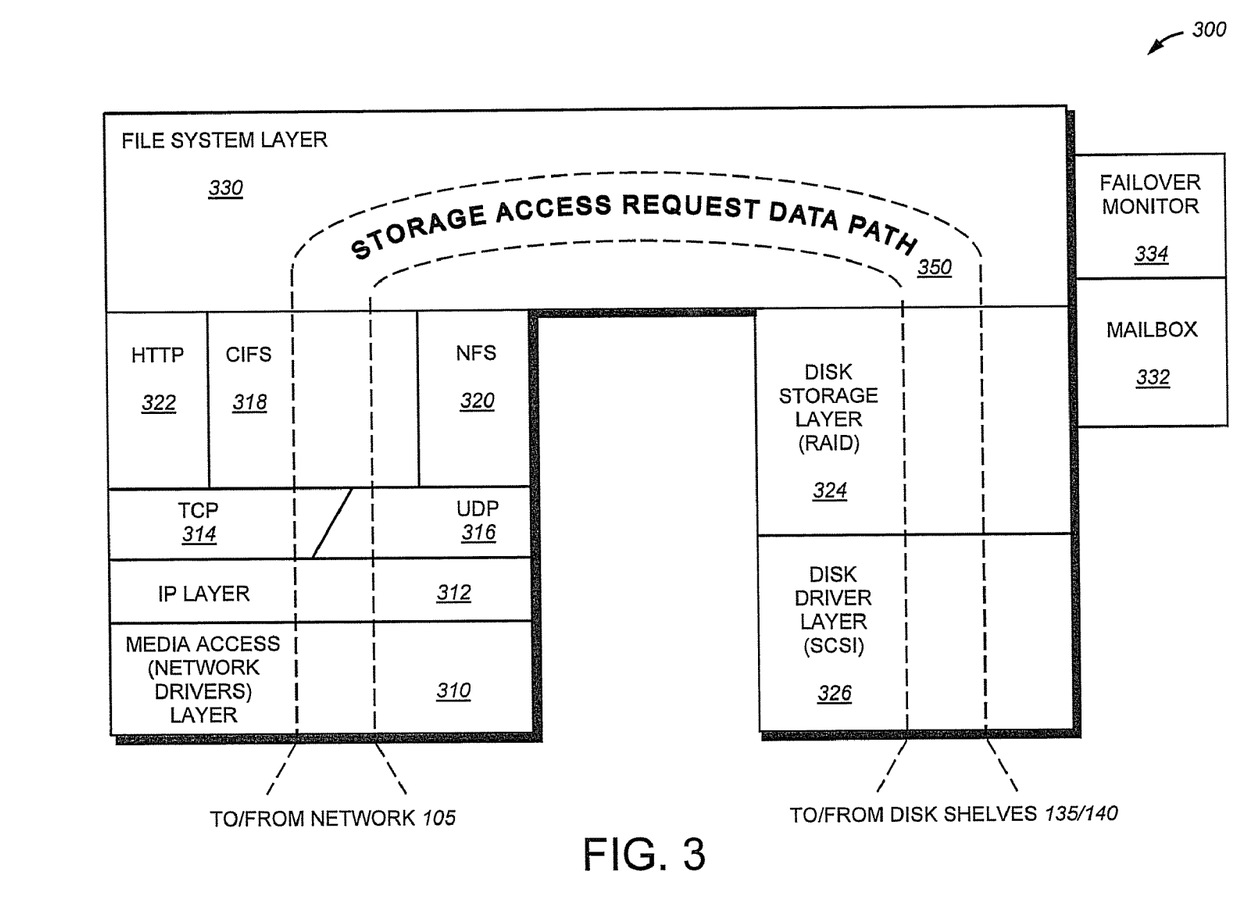
FIG. 3 is a schematic block diagram of an exemplary storage operating system that may be advantageously used with the present invention.

FIG. 3 is a block diagram of an exemplary storage operating system 300 for use on file servers 115. The storage operating system comprises a series of software layers, including a media access layer 310 of network drivers (e.g., an Ethernet driver). Operating system 300 further includes network protocol layers, such as the IP layer 312 and its supporting transport mechanisms, the Transport Control Protocol (TCP) layer 314 and the User Datagram Protocol (UDP) layer 316. A file system protocol layer includes support for the Common Interface File System (CIFS) protocol 318, the Network File System (NFS) protocol 320 and the Hypertext Transfer Protocol (HTTP) protocol 322. In addition, the operating system includes a disk storage layer 324 that implements a disk storage protocol, such as the Redundant Array of Independent Disks (RAID) protocol, and a disk driver layer 326 that implements a disk access protocol such as the small computer system interface (SCSI) protocol.

The storage operating system 300 includes additional software layers, such as a failover monitor 334 that operates with the mailbox functionality 332, described further below, to track the status of a filer's partner in a file server cluster. The failover monitor 334 implements the failover mechanism described in the above-incorporated patent application, entitled EFFECTIVE USE OF NVRAM DURING TAKEOVER IN A NODE CLUSTER.

Bridging the network system and file system protocol layers in the operating system is a file system layer 330 that controls storage and retrieval of data on disks in each disk shelf.

If the failover monitor 334 in the local filer determines that there is a failure in the partner filer that requires it to take over the partner filer, the local filer takes over the operations of its partner. An example of a method for a filer to take over the operations of another filer is described in U.S. Pat. No. 6,728,897 entitled NEGOTIATED TAKEOVER IN A HIGH AVAILABILITY CLUSTER, by Samuel M. Cramer, et al., issued on Apr. 27, 2004, which is incorporated by reference herein.

Notably, the mailbox layer 332 interacts with the disk storage layer 324, the file system layer 330 and the failover monitor 334 to implement the novel mailbox mechanism described further below.

D. Mailbox Structure

Figure 4:
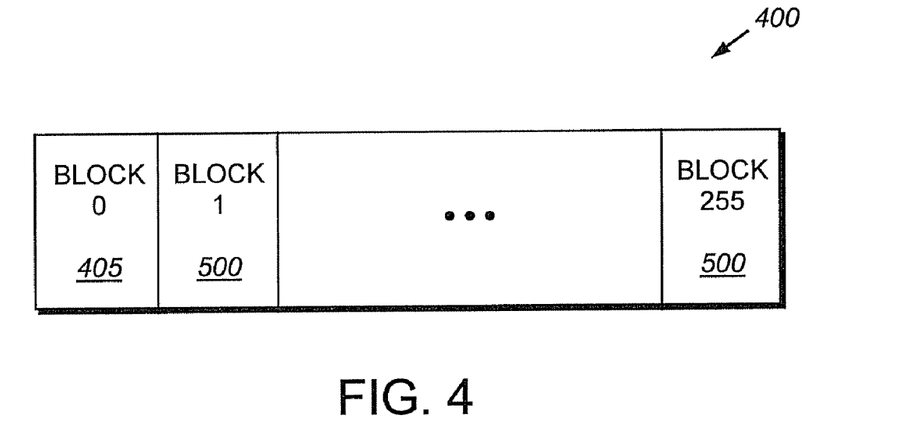
FIG. 4 is a schematic block diagram of an exemplary data structure stored on a storage device in accordance with an embodiment of this invention.

In accordance with an illustrative embodiment of the present invention, the coordinating information is stored in the disks that also are used to contain the user data served by the file server responsible for the disks. Special dedicated areas are reserved within each storage device so that the dedicated areas may be directly accessed without resorting to file system software. By directly accessing the storage devices, the mailbox layer 332 of the storage operating system is not dependent upon file system concepts such as volumes or the online state of the volume. A one megabyte (MB) area is reserved in a known and dedicated area of the disks used within a file server cluster. This one megabyte area is further broken into 256 blocks of 4 kilobytes (KB) each. FIG. 4 is a schematic block diagram of an exemplary one megabyte data structure in accordance with an embodiment of this invention. In the illustrative embodiment, Block 1 (500) and Block 255 (500) are used to store the master mailbox record or block in accordance with an embodiment of this invention. The master mailbox record (MMR) is stored in two places to allow for a "careful write." By "careful write" is meant an operation wherein the first copy is written to disk and after the successful completion of that write operation, then the second copy is written to disk. This ensures that should an error condition occur while writing a copy is in progress, both copies do not become corrupted.

Figure 5:
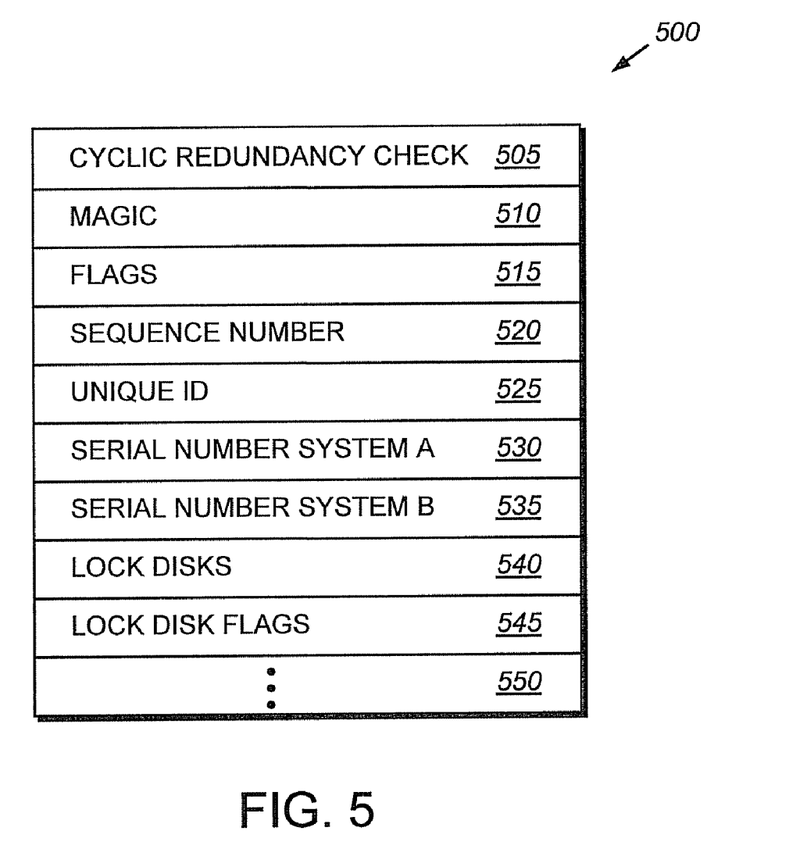
FIG. 5 is a schematic block diagram of a master mailbox record in accordance with an embodiment of this invention.

FIG. 5 is a schematic block diagram of an exemplary MMR 500 in accordance with an embodiment of this invention. The MMR includes a plurality of fields including fields for a cyclic redundancy check 505, a magic field 510, flags 515, sequence number 520, an unique identification 525, a serial number for system A (530) and system B (535), entries for various lock disks 540, flags for the lock disks 545 and, alternate embodiments, other fields 550. This cyclic redundancy check field 505 contains a cyclic redundancy check (CRC) of the MMR. The CRC ensures that data stored in the mailbox is not corrupted by errors that occur during the read or write processes. The magic field 510 includes a predetermined and known specific value that works to distinguish a MMR from the contents of a disk that has not been formatted with a MMR. Thus, if a disk that does not include a MMR is introduced to a file server cluster that is utilizing the present invention, a file server, by checking the contents of the MMR's magic field, can determine whether or not the disk has a valid MMR.

The flags field 515 is used to store various flags to identify various modes that the mailbox is operating in. One flag is defined as the A_WRITER flag, which identifies that the system having the serial number for system A entry 530 is the current "owner" of the mailbox and is allowed to write to the mailbox. Similarly, the flags field 515 can contain a B_WRITER flag that alerts the mailbox that a system having the serial number for system B entry 535 is permitted to write to the mailbox. Additionally, there may be a DONT_SEIZE flag, an A_SEIZING and a B_SEIZING flags, which can be utilized in accordance with the seizing protocol described below.

The sequence number entry 520 is a monotonically increasing number that can be used to distinguish the successive values of the MMR. Thus, each time a new MMR is created and written to disks, the sequence number is increased. A system having two differing MMR's can compare sequence numbers to determine which is the later-generated one. The unique identifier field 525 is utilized to distinguish disks that are formatted by different systems.

The system A serial number field 530 is the system serial number for the primary filer that is serving data on the set of disks. Similarly, the serial number for system B (535) is a system serial number for the backup filer serving data on a given set of disks.

The lock disks entry 540 is an array of identifiers of the disks that are considered to be the lock disks for this mailbox. Certain disks are designated as lock disks. The fundamental technique used to interlock transactions initiated by the two filers that need to exclude each other is to require that each transaction only succeed if it is able to update all members of some subset of the lock disks, and to define the subsets in such a way that any subset that allows one filer to succeed and any subset that allows the other filer to succeed will have at least one disk in common. This disk will act as a point of synchronization that will exclude one or the other filer from succeeding.

This technique will be recognized by those familiar with the art as similar to the well-known "Quorum Consensus" technique.

The lock disk flag entry 545 is an array of flag bit valves that are associated with the corresponding slots in the lock disks array 540. The lock disk flags, in the illustrative embodiment, contains two flags. If the lock disk flags is marked as ONLINE, then the disk identified in the associated lock disks entry 540 is a fully functioning lock disk. If the lock disks flag entry is marked as REFERRAL, then the disk identified in the lock disk entry 540 may be a fully functioning lock disk or may be in the process of transitioning to or from the state of being a fully functioning lock disk.

A lock disk is identified as a lock disk by the fact that the MMR stored upon the disk contains at some slot in the mbx_lockDiskWWNs array the World Wide Name of the disk, and furthermore at the corresponding slot in the Lock Disk Flags array the ONLINE flag will be set true. Any disk containing an MMR that does not have an entry in the mbx_lockDiskWWNs array that matches the World Wide Name of that disk is not a lock disk. Also if there is such a matching entry but the ONLINE flag is not true in the corresponding slot in the Lock Disk Flags array then the disk is not a lock disk.

In the illustrative embodiment, a worldwide name of the disk is stored in the array of lock disks 540. A world wide name (WWN) is a 64-bit identification number, which is unique for every disk attached to a system. World wide names for Fibre Channel disks are described in ANSI3.230-1995, Fibre Channel Physical and Signaling Interface (FCPH) and Bob Snively, New Identifier Formats Based in IEEE Registration X3T11/96-467, Revision 2, which are hereby incorporated by reference. A world wide name is generally inserted into a disk drive during its manufacturing process. It is expressly contemplated that other types of disks that use alternate forms of naming, e.g., ATA or an external RAID vendor, may be utilized in accordance with the teachings of the present invention.

Figure 6:
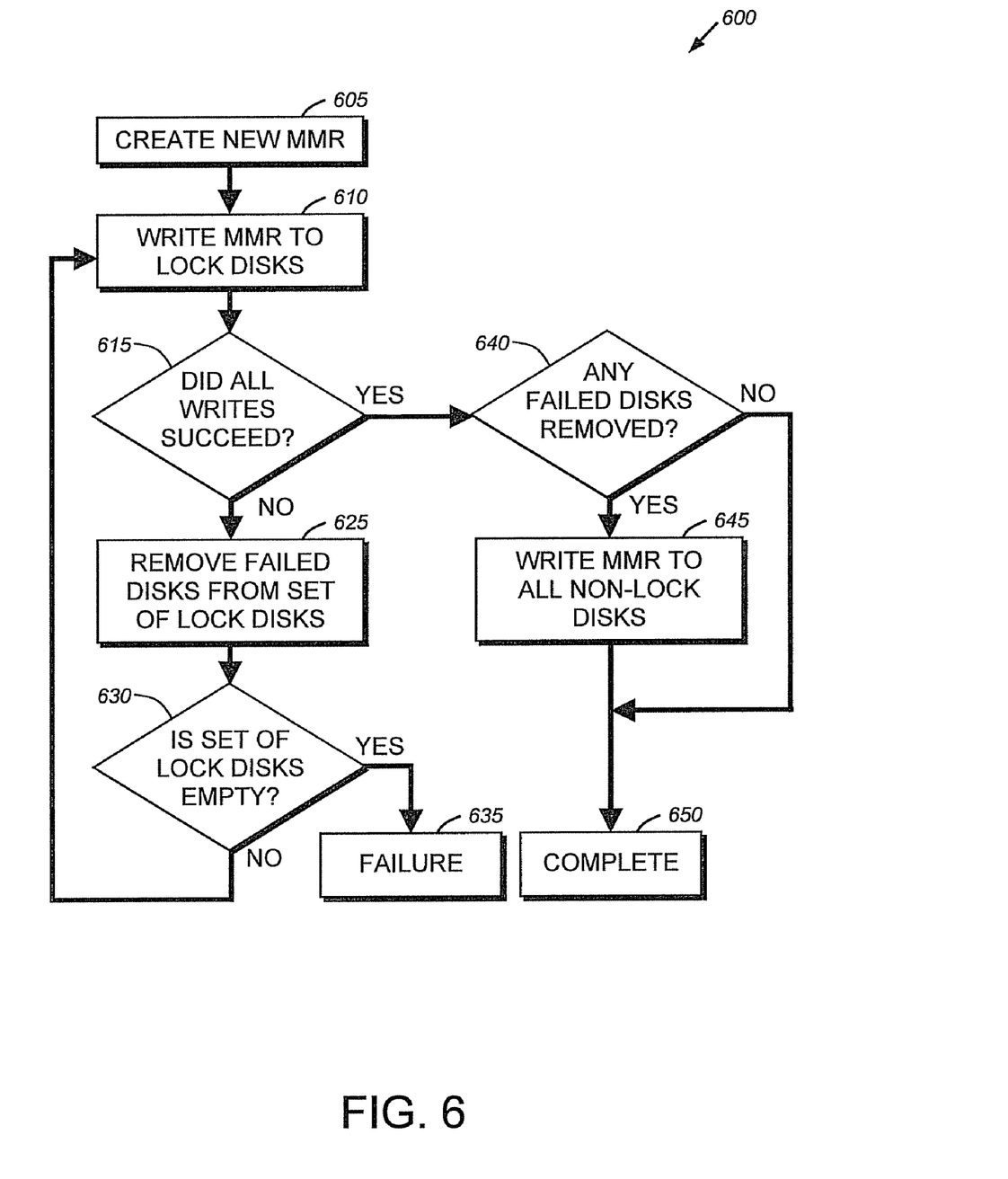
FIG. 6 is a flow chart detailing the steps of a procedure in writing a master mailbox record to a set of lock disks in accordance with an embodiment of this invention.

The procedure for writing a master mailbox record (MMR) to a set of lock disks is shown in FIG. 6. Initially, the mailbox layer creates the new MMR in step 605. The new MMR is stored in the memory of the file server and is created to include the proper fields and flags for the various elements of the MMR. Next, in step 610, the MMR is written to all of the disks that comprise the set of lock disks. As the MMR is stored in a set location that is not dependent upon file system semantics, this writing process can be implemented directly by accessing a disk using, for example, SCSI commands. Next, in step 615, the mailbox layer determines if all writes succeeded. If all the writes have not succeeded, then the mailbox layer then removes the failed disks from the set of lock disks in step 625. As these failed disks were not able to be written to, they should not be utilized as lock disks. At this point, after the removal of failed disks from the set of lock zo disks, the set of lock disks actually contained within the MMR is the set that was updated by step 625, i.e., the updated list of valid lock disks. After the disks that were not successfully written to are removed from the set of lock disks a determination is made if the set of lock disks is empty (decision block 630). If the set of lock disks is empty, i.e. the disks that were not able to be written to comprised all of the lock disks, then a failure occurs in step 635. If the set of lock disks is not empty, then the mailbox layer loops back to step 610 and writes the MMR to the set of lock disks.

If all writes succeeded (step 615), then the procedure determines if any failed disks were removed (step 625). If any failed disks were removed, i.e., step 625 was executed, then the procedure writes the MMR to all non-lock disks in step 645 at which point the procedure is complete (step 650). If no lock disks were removed, then the procedure completes (step 650) without writing the MMR to the non-lock disks.

When a file server in a fault tolerant cluster needs to access the most up-to-date coordinating information, the file server reads the coordinating data stored in the master mailbox record. A file server would read this information when, for example the file server initializes after a power failure or other error condition, after a change in the system topology by, for example adding or removing disks, or when the file server requires the most up-to-date information. Processes within the mailbox layer 332 of the storage operating system 300 access the coordinating information stored in the master mailbox record.

Figure 7:
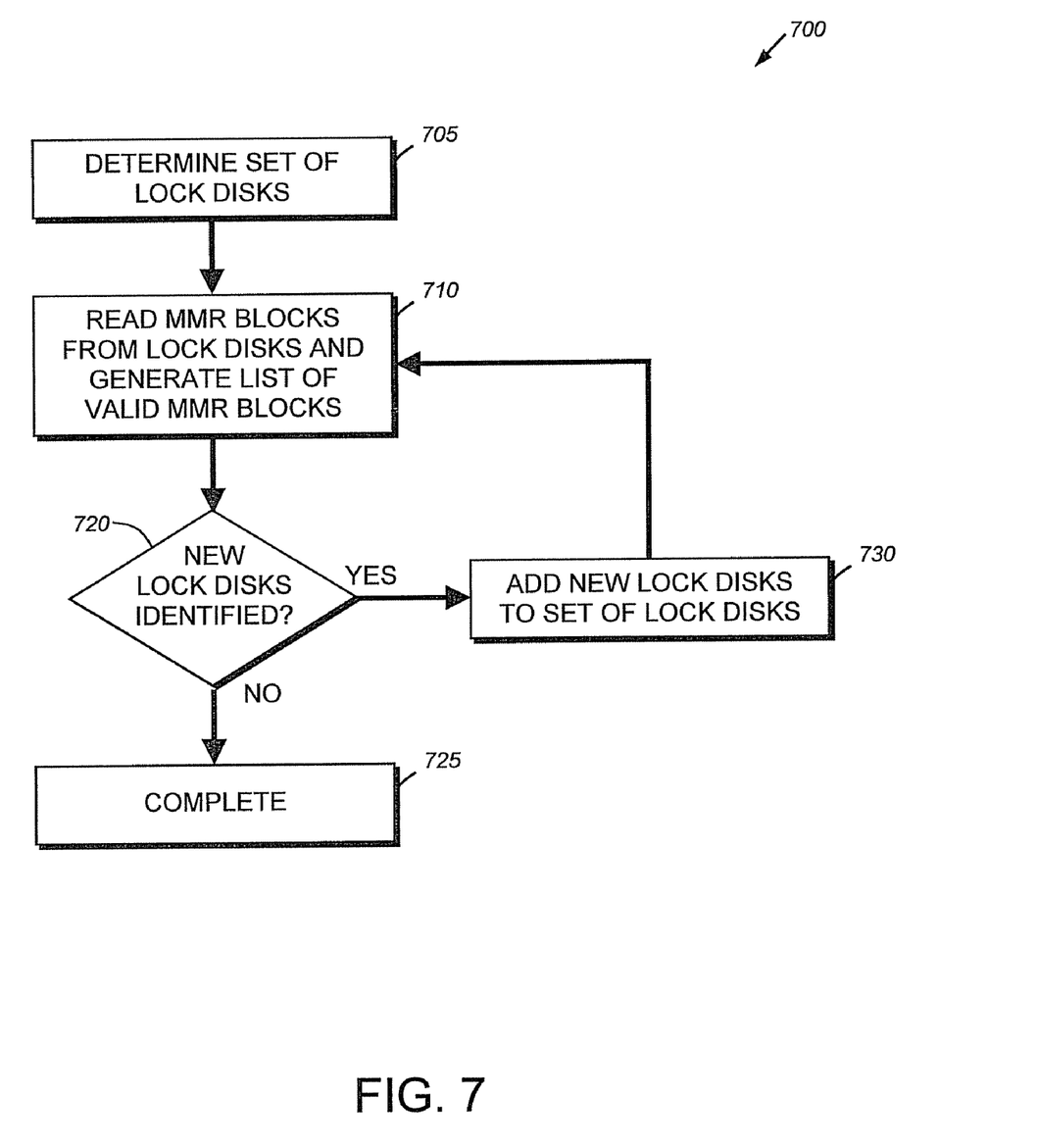
FIG. 7 is a flow chart detailing the steps of a procedure for reading the master mailbox record from a set of lock disks in accordance with an embodiment of this invention.

FIG. 7 details a read procedure 700 used by the mailbox layer 332 of the storage operating system 300 in reading the coordinating data stored in a master mailbox record. Initially, in step 705, the mailbox layer will determine a set of lock disks. This set of lock disks is, in the illustrative embodiment, identified by a list of worldwide names associated with the lock disks to be read. This list of worldwide names can be constructed by accessing the lock disks element of a stored MMR. Typically, the starting set of lock disks has been retained from a previous read operation. However, in alternate embodiments, the initial list of lock disks may be empty and the procedure reads all available disks to generate the initial set of lock disks. Next, in step 710, the MMR block is read from each of the identified lock disks. Each MMR block is verified by, for example, matching the worldwide name associated with the disk upon which the MMR was stored to each entry in the array of lock disks within the MMR and testing that the appropriate ONLINE flag has been set in the lock disk flags entry of the MMR. If a MMR that is read does not contain the worldwide name of the disk from which it was read, in its lock disk array, or if the associated lock disk does not have its ONLINE flag set in the lock disk flags element of the MMR, then the MMR block that was read from the disk is discarded and not used. This verification process occurs after each MMR block is read.

Also during this verification process, the sequence number entries of each of the valid MMR blocks is scanned to determine which MMR block has the highest sequence number. The coordinating data stored in the MMR of the block with the highest sequence number is considered to be the best and most reliable output that has been attained at this point in the procedure. After generating a list of the valid MMR blocks, the mailbox layer determines if there are any new lock disks identified within the lock disks array stored within these valid MMR blocks (decision step 720). If there are additional disks that are identified as lock disks within the previously verified MMR blocks, then these new lock disks are added to the set of lock disks in step 730 and then the procedure loops back to step 710. If there are no new lock disks identified in decision step 720, then the process is complete (step 725). Once step 725 has been reached, it is possible to determine whether the information obtained is guaranteed to be current or if the information may possibly be stale. This information can be generated by examining the record of the operations conducted. Specifically if the disks in the array recorded in the best MMR obtained were all in the set of the disks used in the last execution of step 710 and all of these disks were read without error, then the information is current. That is, if a disk in the list used in step 710 returns an error, then the information is not guaranteed to be current, unless it turns out that the returned information from other disks identifies that at step 730 the disk in error is not needed and, in fact, already has been removed.

Figure 8:
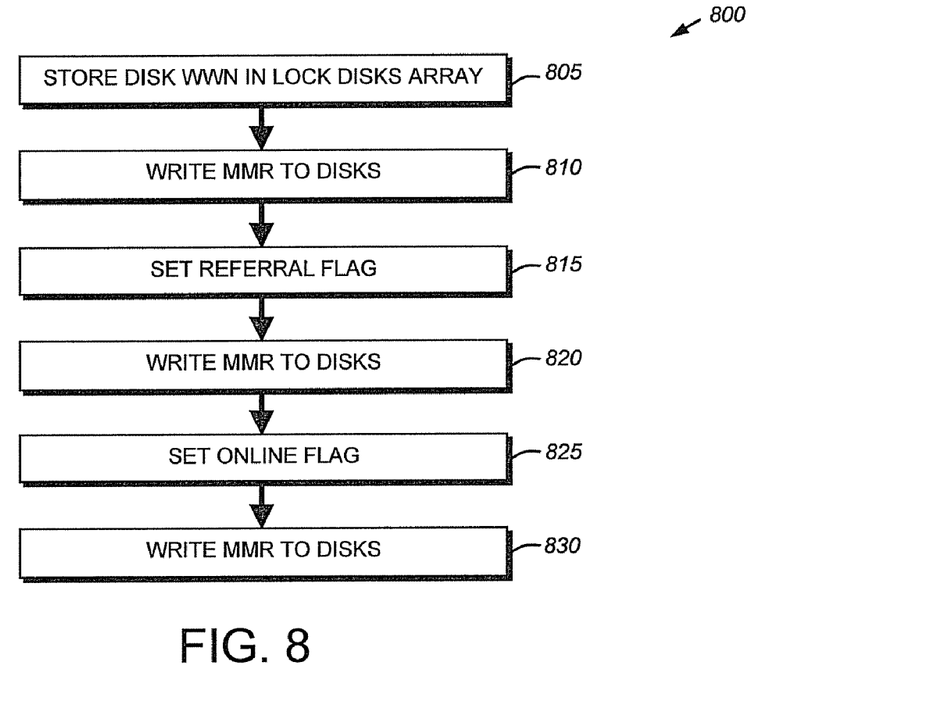
FIG. 8 is a flow chart detailing the steps of a procedure in adding a new disk to a set of lock disks in accordance with an embodiment of this invention.

The procedure utilized by the mailbox layer 332 of the storage operating system in adding a disk to a set of lock disks is shown in FIG. 8. First, in step 805, the worldwide name of the disk to be added is stored in the lock disk array of the MMR. This MMR is then written, in step 810, to both the new disk and all the disks that are already members of the lock disk set. Once this write procedure has completed, the REFERRAL flag is set to a value of TRUE for the disk in the appropriate lock disk flag entry of the MMR. The MMR is then written again to the disks in step 820. Next, in step 825, the appropriate ONLINE flag is set to a value of TRUE. The MMR is then written to the set of lock disks again in step 830. By writing the MMR to disks three times two important properties are guaranteed. The first important property is that no disk is marked for REFERRAL until the disk has been initialized with a MMR that contains the worldwide names of all the disks that are already members of the lock disk set. The second important property is that no disk is marked as ONLINE until that disk is first marked as REFERRAL in all of the disks that are members of the lock disk set. These two properties guarantee that a disk that is marked ONLINE is at least marked as REFERRAL in all disks of a lock disk set. Similarly a disk that is marked as REFERRAL has been properly initialized so that the contents of its MMR matches, or at least does not contradict, the contents of other disks in the mailbox.

At times it may be desirable for a file server to remove a particular disk from the set of lock disks. This removal may be due to an error in a particular disk, loop or other component of the network cloud, or do to a reconfiguration or change of the disks in a volume or in the topology of a given network arrangement.

Figure 9:
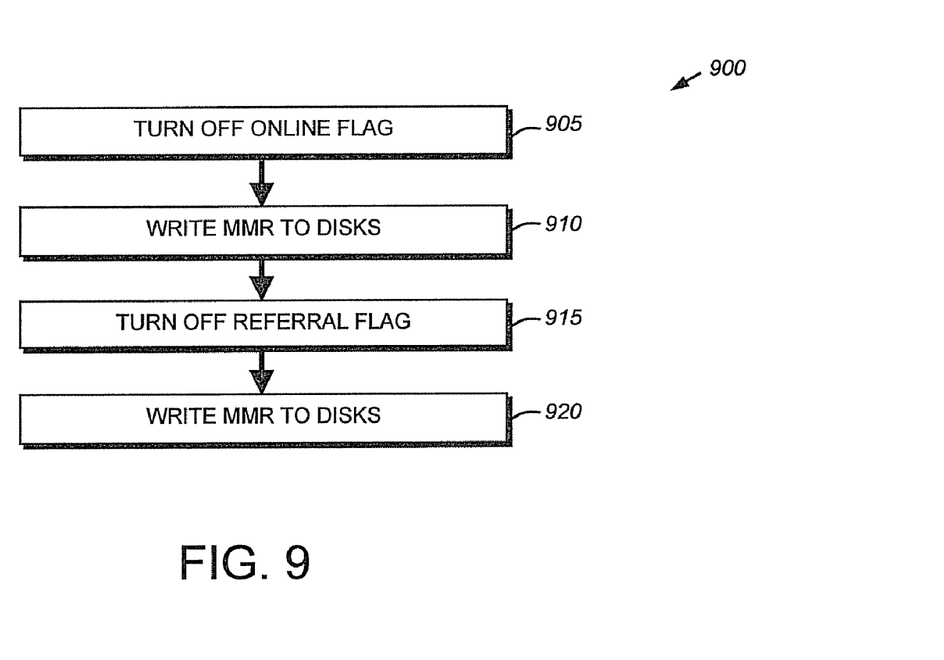
FIG. 9 is a flow chart detailing the steps of a procedure for removing a disk from a set of lock disks in accordance with an embodiment of this invention.

The procedure 900 is performed by the mailbox layer of the storage operating system 332 when a disk is to be removed from the set of lock disks, but that disk is still accessible. Initially, in step 905, the ONLINE flag is set to FALSE. Then, in step 910, the MMR is then written to a set of lock disks. After that write has been completed, the REFERRAL flag is then set to FALSE (step 915). After the REFERRAL flag has been modified, then the MMR is again written to the set of lock disks, including the disk that is being removed in step 920.

Figure 10:
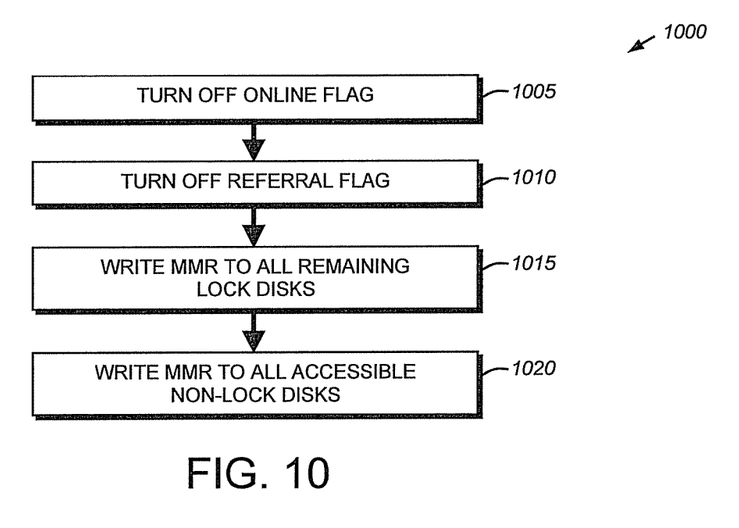
FIG. 10 is a flow chart detailing the steps of a procedure for removing a failed disk from a set of lock disks in accordance with an embodiment of this invention.

FIG. 10 shows the procedure 1000 performed by the mailbox layer in removing a disk from a set of lock disks when the disk cannot be accessed. Initially, in step 1005, the ONLINE flag associated with the failed disk is set to FALSE. Then, in step 1010, the REFERRAL flag associated with the failed disk is set to FALSE. After these two flags have been modified in the MMR and stored by the mailbox layer, the MMR is then written to all accessible disks in step 1015. This set of all accessible disks includes all of the disks associated with the group of disks that utilize a given mailbox or MMR. As a result of writing this revised MMR to all the accessible disks, all such disks have an updated copy of the MMR that reflects the fact that the failed disk is no longer a lock disk.

By writing the MMR to all accessible disks, protection is provided in the event that the failed disk subsequently becomes accessible again at a time when all of the surviving lock disks have become inaccessible. This would be a potential partition-in-time scenario; however the presence of the updated MMR on all of the other accessible disks serves as a warning that the failed and later returned disk does not possess the current coordinating information. It should be noted that this is not the only method for determining that one or more lock disks are stale. The Read procedure 700 also enables the mailbox layer to determine that lock disks contain stale information.

Figure 11:
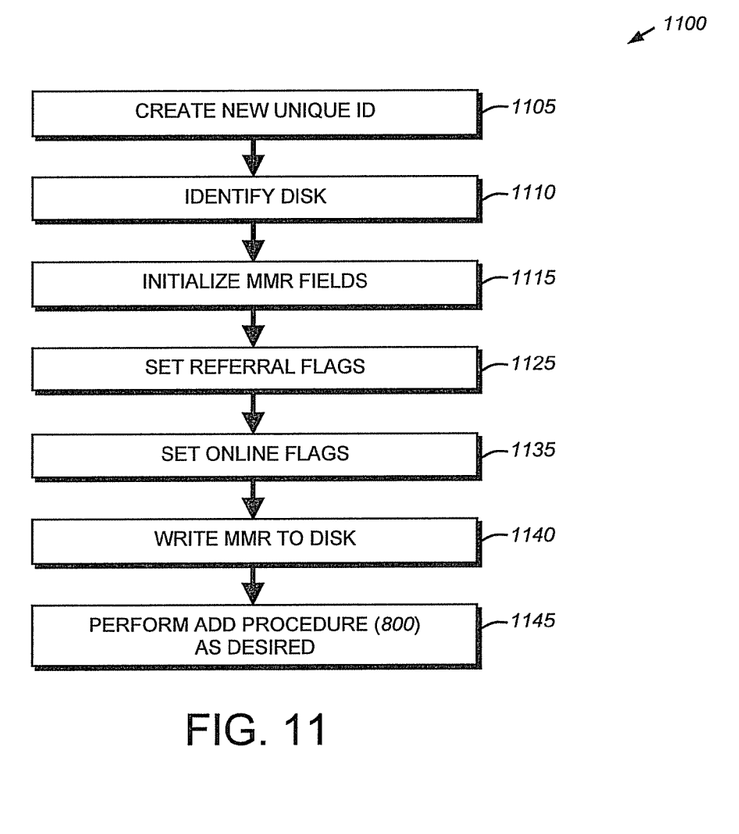
FIG. 11 is a flow chart detailing the steps of a procedure for creating a new set of lock disks in accordance with an embodiment of this invention.

The procedure for creating a set of lock disks for use with an illustrative embodiment of the present invention is shown in a flow chart in FIG. 11. Initially, in step 1105, a new unique identifier is generated. Next, in step 1110, one disk is identified to hold the contents of the mailbox. The MMR fields are then initialized to the appropriate values in step 1115. Next, in step 1125, the REFERRAL flags are set to TRUE for selected lock disk. Then the ONLINE flags are set to TRUE for each of the associated entries of selected lock disk (step 1135). After the ONLINE flags have been set, then the MMR is written to the disk in step 1140. If an error condition occurs during the writing of the MMR to the disk, then the procedures described above in reference to the write procedure are utilized. After the single lock disk has been created, then the procedure 800 as desired to add any additional desired disks (step 1145). This may lead to an outcome in which some of the disks are removed from the set of lock disks. Similarly to the write procedure described above, if no lock disks remain, then the procedure fails. At the conclusion of this procedure, all of the lock disks have been appropriately marked with a proper unique ID and with the array of lock disks identifying the set of lock disks. At this point in time, the mailbox instance is considered to be created.

By utilizing the procedures described above in accessing and writing coordinating information to a MMR, file servers in a cluster environment ensure that if the most recently committed coordination data is not present, that this condition can be reliably detected.

Figure 12:
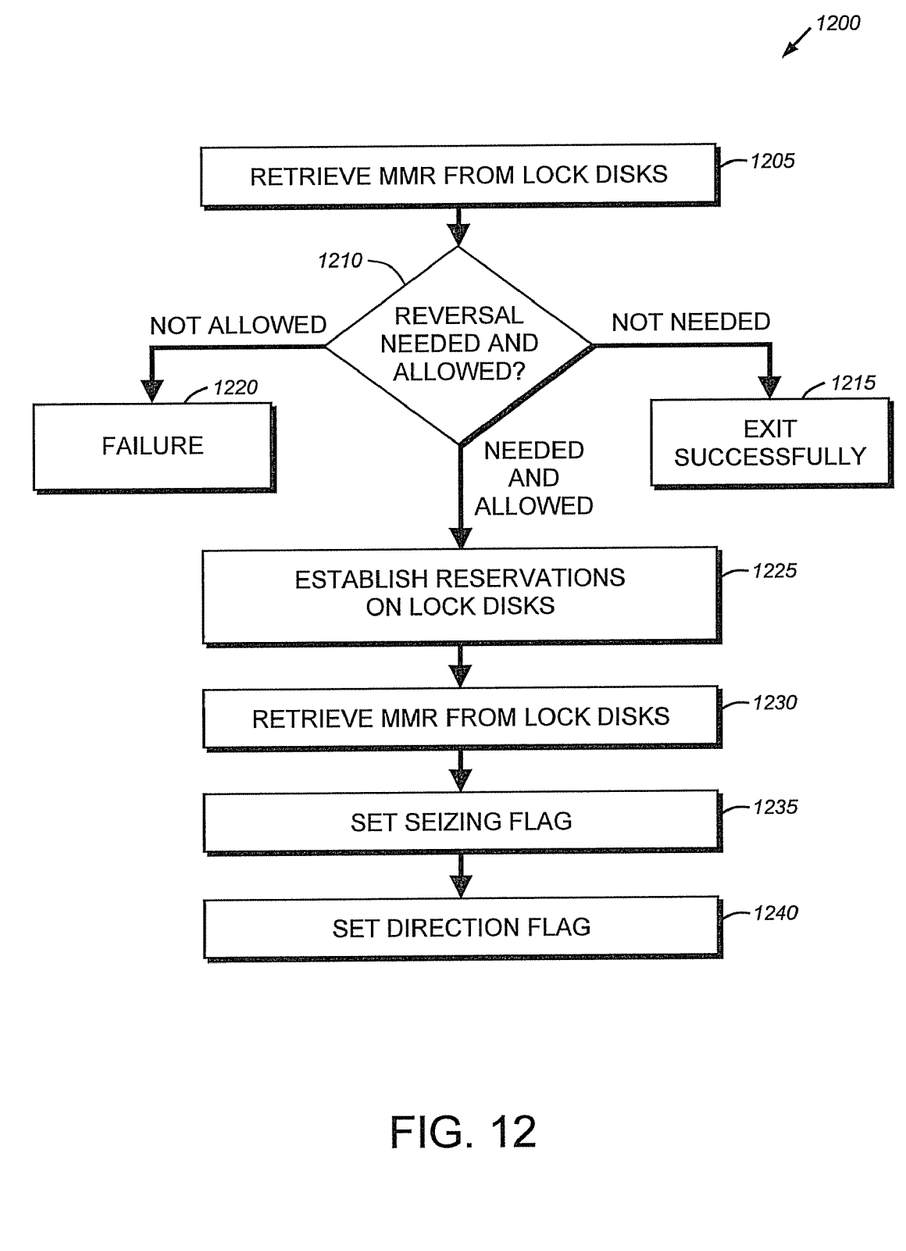
FIG. 12 is a flow chart detailing the steps of a procedure for a file server to seize control over a set of lock disks in accordance with an embodiment of this invention.

A procedure 1200 for seizing a master mailbox record is shown in FIG. 12. A filer may need to seize a MMR during a failover or takeover operation. The seizing procedure 1200 enables a filer that is not normally permitted to modify a MMR to begin modifying the MMR. Initially, in step 1205, the seizing filer retrieves the MMR from the set of lock disks. Next, in step 1210, the filer determines if the MMR needs to be and can be reversed in direction. If reversal is not allowed, then the procedure fails (step 1220). If reversal is not needed, then the procedure exits successfully (step 1215).

If reversal is needed and allowed, then the seizing filer establishes appropriate reservations on the set of lock disks (step 1225). These reservations can be accomplished by using appropriate SCSI reservation commands. Once the appropriate reservations have been set, the seizing filer then retrieves the MMR from the set of lock disks (step 1230). Then, in step 1235, the filer sets the seizing flag within the MMR. Finally, the seizing filer sets the appropriate direction flag in step 1240. The direction flag indicates which filer of a cluster is the master of the MMR.

To again summarize, in the illustrative embodiment, a one-megabyte location, comprising 256 four kilobyte blocks is created in a set and predetermined location on each disk in a file server cluster. In two of these blocks, a master mailbox record is stored, which contains coordinating information as to the state of the file system configuration. A subset of the disks associated with a file server cluster are labeled as lock disks, which are required to contain the most recently stored coordinating information. The set of lock disks should be chosen in a way that is consistent with a RAID configuration so that, for any combination of disks for which RAID is able to continue providing service, there is at least also contain one lock disk. As long as the set of accessible disks containing at least one lock disk, then one valid copy of the most recent coordinating information will be accessible.

Data is written to the two locations of the MMR on disks using a careful write technique, in which only one location is written to at a time. Thus, a power interruption or other failure will not cause both locations to become inaccessible or corrupted.

The teachings of the present invention provides better availability than conventional quorum-based designs. Conventional quorum-based designs can support sequential consistency, but exact a heavy price. A system with (2F+1) nodes can tolerate only F failures. Hence the minimum configuration to tolerate one failure requires three nodes. A two node configuration cannot tolerate any failures. The invention described herein can tolerate the failure of all but one node (lock disk) when those failures occur while the system is in the "steady state." The system relies upon volatile memory and non-volatile memory to retain state information allowing it to protect against loss of sequential consistency even if all but one lock disk fail or become inaccessible.

Conventional mirroring designs require only two elements to tolerate loss of one element, however they are vulnerable to loss of sequential consistency. The invention described herein can provide appropriate warning when sequential consistency may been lost. A conventional mirroring design could also provide such a warning; however, effective use of such warning requires minimization of the occurrence of false alarms in order to be practical. The present invention minimizes such false alarms when the failures of components occur while the system is in the steady state by the technique of dynamically adjusting and recording the lock disk configuration so as to minimize exposure to situations in which needless warning is given.

Different tradeoffs of availability and reliability may be applicable to different customer environments. The invention here described provides warning to the higher level software (the Failover Monitor) when the persistent information may have lost sequential consistency. Additionally, the present invention uses the technique of storing header information on disks other than the lock disks in order to provide a stronger warning when the available lock disks are definitely known to be stale as a result of earlier failures.

Additionally, many textbook quorum algorithms require either a priori knowledge of the configuration and number of participating nodes by the software, or otherwise require some separate method of providing configuration information to the software in order to be adapted to varying situations. The invention described herein integrates the configuration management of the replicated storage into the replicated storage algorithm itself, so that the same techniques used to store and retrieve the payload data may also be used to store and retrieve the description of the configuration. The advantages obtained from this invention are largely due to this dynamic configuration management. An additional advantage is that of greater flexibility in dealing with dynamically changing hardware configurations.

The foregoing has been a detailed description of illustrative embodiments of the invention. Various modifications and additions can be made without departing from the spirit and scope of the invention. While this description has been written in reference to file servers and storage operating systems, the principles described herein may be applied to any computer executing an operating system which is engaged in a cluster environment. In addition, it is expressly contemplated that any of the operations and procedures described herein can be implemented using hardware, software comprising a computer-readable medium having program instructions executing on a computer or a combination of hardware and/or software.

What is claimed is:

1. A method for managing a plurality of computer servers, comprising:
    configuring the plurality of servers to have access to data stored by each server of the plurality of servers;
    storing the data on one or more data storage devices accessible by the plurality of servers;
    writing coordinating information for the plurality of servers to a master mailbox record, where the coordinating information includes recovery data that the each server uses to recover after a failure by a failed server of the plurality of servers, and where the master mailbox record is stored on a selected storage device at a location known to the plurality of servers, the selected storage device designated as a selected lock storage device; and
    choosing a plurality of lock storage devices so that upon of failure of the failed server, at least one lock storage device is available to the remaining servers of the plurality of servers.

2. The method as in claim 1, further comprising:
    maintaining more than one copy of the master mailbox record on each lock storage device.

3. The method as in claim 1, further comprising:
    using a slow write procedure to write the master mailbox record, where a slow write first writes a first copy of the master mailbox record; and
    responsive to the first copy being recognized as successful, writing a second copy of the master mailbox record.

4. The method as in claim 1, further comprising:
    determining if all writes of coordinating information succeeded; and
    removing a lock storage device for which a write did not succeed from the plurality of lock storage devices.

5. The method as in claim 1, further comprising:
    if after removal of the lock storage device for which the write failed leaves one or more remaining lock storage devices, writing the coordinating information a second time to the remaining lock storage devices, and if the writes of the coordinating information the second time are successful on the remaining lock storage devices, recognizing that the master mailbox record is correct on all of the lock storage devices.

6. The method as in claim 1, further comprising:
    permitting direct access to the master mailbox record by the servers without a need for file system semantics so that contents of the master mailbox record are available to a server which has not experienced a failure.

7. The method as in claim 1, further comprising:
    making the coordinating information written by a first server available to another server at some later time in order to prevent partitioning problems such as a loss of data consistency, a partition in space problem, and a partition in time problem, restart the system with missing data.

8. The method as in claim 1, further comprising:
    using a writeable persistent storage device as the storage device.

9. The method as in claim 1, further comprising:
    using a memory as the storage device.

10. The method as in claim 1, further comprising:
    using a NVRAM as the storage device.

11. An apparatus of a plurality of computer servers, comprising:

each server of the plurality of servers having access to data stored by each server of the plurality of servers, the data stored on one or more data storage devices accessible by the plurality of servers;

a master mailbox record containing coordinating information for the plurality of servers, where the coordinating information includes recovery data that the each server of the plurality of servers uses to recover after a failure by a failed server, and where the master mailbox record is stored on a selected storage device at a location known to the plurality of servers, the selected storage device is designated as a lock storage device; and a set of lock storage devices chosen so that upon failure of the failed server of the plurality of servers, at least one lock storage device is available to remaining servers of the plurality of servers.

12. The apparatus as in claim 11, further comprising:
more than one copy of the master mailbox record maintained on each lock storage device.

13. The apparatus as in claim 11, further comprising:
a slow write procedure used to write the master mailbox record, where a slow write first writes a first copy of the master mailbox record, and in response to the first copy being recognized as successful, writing a second copy of the master mailbox record.

14. The apparatus as in claim 11, further comprising:
the apparatus configured to determine if all writes of coordinating information succeeded, and responsive to a write not succeeding, removing a lock storage device for which the write did not succeed from the set of lock storage devices.

15. The apparatus as in claim 14, further comprising:
if after removal of the lock storage device for which the write failed leaves one or more remaining lock storage devices, the apparatus configured to write the coordinating information a second time to the remaining lock storage devices, and if the writes of the coordinating information the second time are successful on the remaining lock storage devices, recognizing that the master mailbox record is correct on all of the remaining lock storage devices.

16. The apparatus as in claim 11, further comprising:
the plurality of servers configured to permit direct access to the master mailbox record by a server without a need for file system semantics so that contents of the master mailbox record are available to any server which has not experienced a failure.

17. The apparatus as in claim 11, further comprising:
the coordinating information written by a first server is available to another server at some later time in order to prevent partitioning problems such as a loss of data consistency, a partition in space problem, and a partition in time problem, that restarts the system with missing data.

18. The apparatus as in claim 11, further comprising:
magnetic disks used as the storage devices.

19. The apparatus as in claim 11, further comprising:
a RAID array used as the data storage device.

20. The apparatus as in claim 11, further comprising:
a NVRAM used as the storage device.

21. A computer readable storage media, comprising:
said computer readable storage media containing program instructions for execution on a processor to manage a plurality of computer servers, the program instructions for, configuring the plurality of servers to have access to data stored by each server of the plurality of servers;

storing the data on one or more data storage devices accessible by the plurality of servers;

writing coordinating information for the plurality of servers to a master mailbox record, where the coordinating information includes recovery data that the each server uses to recover after a failure by a failed server of the plurality of servers, and where the master mailbox record is stored on a selected storage device at a location known to the plurality of servers, the selected storage device designated as a selected lock storage device; and choosing a plurality of lock storage devices so that upon failure of the failed server, at least one lock storage device is available to remaining servers of the plurality of servers.

22. The method of claim 7, further comprising:
the partition in space problem including a failure of a connectivity between servers and storage devices that allow different servers to have access to different sets of storage devices at the same time, permitting the different sets of storage devices to have different data written thereto.

23. The method of claim 7, further comprising:
the partition in time problem including a loss of connectivity to one set of storage devices as a result of a failure of the storage fabric such as a power failure and the system continues to operate with the remaining set of storage devices but not with an other set of storage devices such that any newly written data will be stored only on the remaining set of storage devices, and if then connectivity is lost to the remaining set of storage devices and if connectivity is then restored only to the other set of storage devices.

24. The apparatus as in claim 17, further comprising:
the partition in space problem includes a failure of a connectivity between servers and storage devices that allow different servers to have access to different sets of storage devices at the same time, permitting the different sets of storage devices to have different data written thereto.

25. The apparatus as in claim 17, further comprising:
the partition in time problem includes a loss of connectivity to one set of storage devices as a result of a failure of the storage fabric such as a power failure and the system continues to operate with the remaining set of storage devices but not with an other set of storage devices such that any newly written data will be stored only on the remaining set of storage devices, and if then connectivity is lost to the remaining set of storage devices and if connectivity is then restored only to the other set of storage devices.

26. The method as in claim 1, further comprising:
using magnetic disks as the storage devices.

27. The method as in claim 1, further comprising:
using RAID arrays as the data storage devices.

28. The apparatus as in claim 11, further comprising:
a writeable persistent storage device used as the storage device.

29. The apparatus as in claim 11, further comprising:
a memory used as the storage device.

* * * * *

UNITED STATES PATENT AND TRADEMARK OFFICE
CERTIFICATE OF CORRECTION

| | | |
|---|---|---|
| PATENT NO. | : 7,953,924 B1 | Page 1 of 1 |
| APPLICATION NO. | : 12/692030 | |
| DATED | : May 31, 2011 | |
| INVENTOR(S) | : Richard O. Larson et al. | |

It is certified that error appears in the above-identified patent and that said Letters Patent is hereby corrected as shown below:

In Col. 3, line 3:
    hamper the goal of ~~minoring~~mirroring.

In Col. 9, line 61:
    point, after the removal of failed disks from the set of lock ~~zo~~

In Col. 13, line 23:
    Conventional ~~minoring~~ mirroring designs require only two elements In Col. 14, line 20:
    choosing a plurality of lock storage devices so that upon ~~of~~

In Col. 14, line 38:
    5. The method as in claim ~~1~~ 4, further comprising:

Signed and Sealed this
Twentieth Day of March, 2012

David J. Kappos
*Director of the United States Patent and Trademark Office*